Dec. 25, 1934.  W. J. PEARMAIN  1,985,423
CLUTCH
Filed April 14, 1932
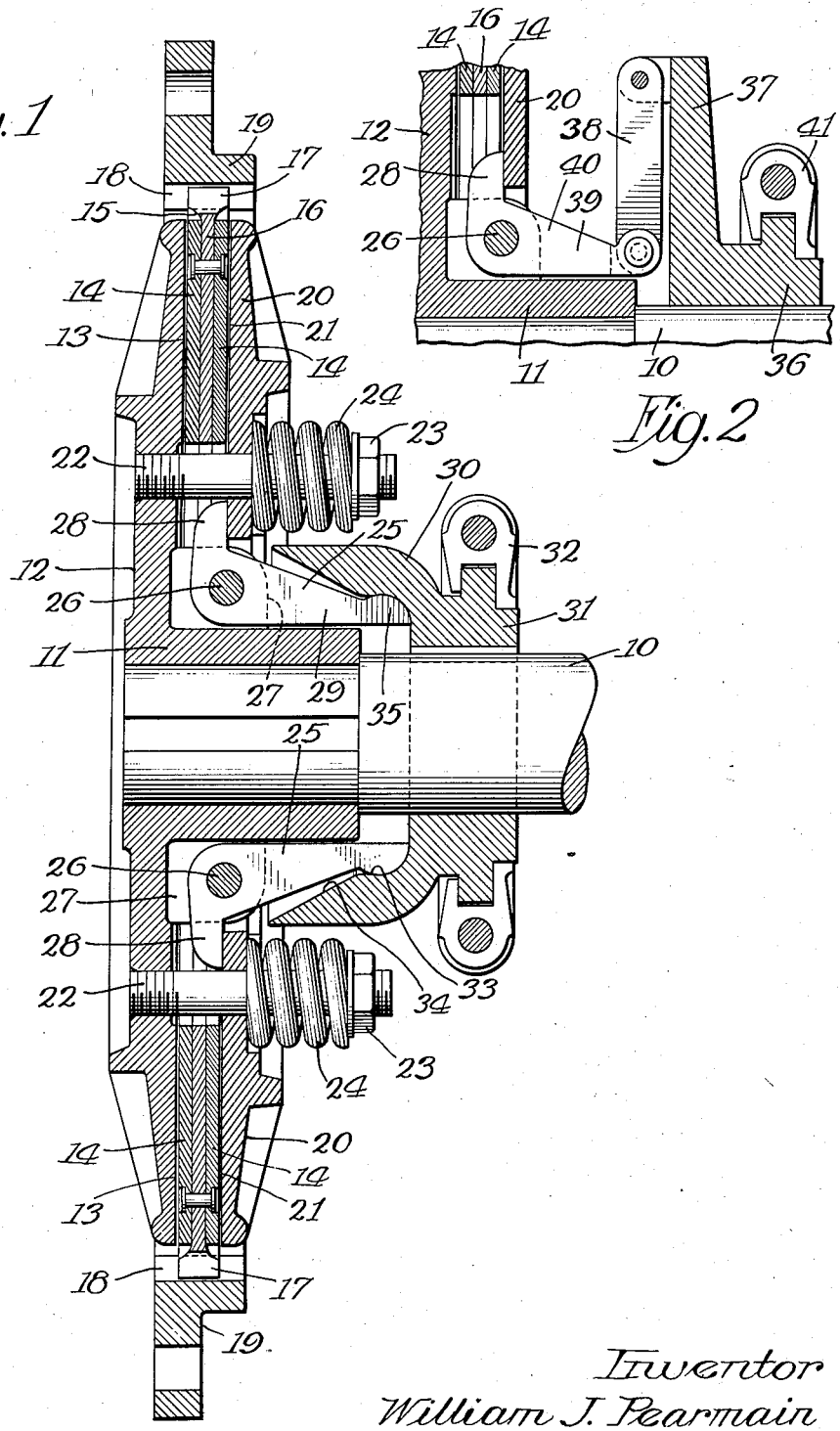
Inventor
William J. Pearmain
By Rector, Hibben, Davis & Macauley Attys.

Patented Dec. 25, 1934

1,985,423

UNITED STATES PATENT OFFICE 1,985,423

CLUTCH

William J. Pearmain, Racine, Wis., assignor to Twin Disc Clutch Company, Racine, Wis., a corporation of Wisconsin Application April 14, 1932, Serial No. 605,139

3 Claims. (Cl. 192—68)

My invention relates to clutches and more particularly to a device of this character in which the transmission of power is effected through a mechanism which is normally in driving engagement.

One object of my invention is to devise a clutch of the spring loaded type in which a driving plate is interposed between, and has driving engagement with, a pair of gripping members, release of these parts being effected by a plurality of suitably actuated clutch levers which are capable of being rocked into appropriate positions, as the clutch facings wear, in order to permit a full driving engagement of the parts when the releasing force is removed.

A further object is to devise a clutch of the type indicated which is characterized by a compactness and thinness of design through a novel arrangement for partially housing the clutch levers between, or in which a portion of each lever is substantially included within the outline of the gripping members, the levers being pivoted on a hub to which is attached the fixed plate of the clutch.

A further object is to provide a clutch in which the inner or releasing ends of the clutch levers engage with the inner face of the pressure plate which constitutes one of the gripping members, provision being made, in conjunction with the actuating sleeve for the levers, to insure that the levers will not interfere with the movement of the pressure plate to driving position, as the clutch facings wear.

A further object is to devise a clutch which is characterized by simplicity of design, ease of and accessibility for adjustment, and a capacity for being installed in locations where the available space is restricted.

These and further objects of my invention will be set forth in the following specification, reference being had to the accompanying drawing, and the novel means whereby said objects are effectuated will be definitely pointed out in the claims.

Fig. 1 is a sectional elevation of my improved clutch, the several parts being shown in a released position, and it being further understood that, when viewed endwise, the clutch possesses a generally circular outline.

Fig. 2 is an elevation, partly in section, of a modified arrangement for actuating the clutch levers.

Referring to the drawing, the numeral 10 designates a shaft which constitutes one of the rotary parts of the device and which, in the present instance, will be considered as the driven member, although the conditions of operation may be reversed in this particular as will be readily understood. The left end of the shaft is keyed or otherwise secured to a hub 11 which has provided thereon a fixed plate 12 that constitutes one of the gripping members of the clutch.

The plate 12 is provided with an annular wearing face 13 which is intended to engage with a facing 14 of frictional material that is riveted in a counterbored recess 15 provided on the adjacent side of a driving plate 16. The peripheral edge of the plate 16 is provided with a plurality of teeth 17 which mesh with similar teeth 18 formed internally on an annular plate 19 that constitutes the other rotary part of the clutch and, in the present instance, is the driving member thereof. As shown clearly in the drawing, the teeth 18 are somewhat longer than the teeth 17, so that the plate 16 is capacitated for axial movement relative to the plate 19, this construction being availed of to insure a positive release of the friction facing 14 from the fixed plate 12 when the clutch parts are released as hereinafter described.

On the opposite side of the plate 16 from the fixed plate 12 is a pressure plate 20 which also includes a wearing face 21 that engages with a friction facing 14 on the adjacent side of the plate 16, the last-named facing being situated and affixed to the plate 16 in a manner identical with that heretofore described with respect to the left facing 14, as indicated in the drawing. The pressure plate 20 is carried by, and is shiftable relative to, the fixed plate 12 by means of a plurality of studs 22, one end of each of which is threaded in the plate 12 and extends through an appropriate aperture provided in the pressure plate 20 to receive on the opposite end thereof a nut 23. Between said nut and the adjacent side of the plate 20, a helical spring 24 encircles the stud 22 and serves to normally maintain driving engagement of the plate 20 with the driving plate 16 and of the latter with the fixed plate 12. As many of the studs 22 may be utilized as is prescribed by the design requirements of the clutch and it will be understood that these studs, and accordingly the springs 24, will be distributed around the shaft 10 in the most convenient and suitable manner.

As stated above, the springs 24 normally maintain driving engagement of the several parts, and in order to release these parts, or move them to the several positions shown in the drawing, the following instrumentalities are provided. A plurality of clutch levers 25 are pivotally mounted on pins 26, the ends of which are carried in spaced pairs of lugs 27 formed on the hub 11 and fixed plate 12, the levers being preferably equi-spaced around the shaft 10 in order to most effectively apply the releasing force as hereinafter described.

The inner end of each lever 25 is provided with a stub arm 28 which bears against the inner face of the pressure plate 20, while the other arm 29 projects externally of the clutch and is received within a cup-shaped part 30 provided on a sleeve 31 that is shiftable on the shaft 10, but keyed thereto in some convenient manner, the sleeve 31 being appropriately moved by a collar 32, in the usual manner.

The portion 30 comprises an internal, cylindrical surface 33 which merges into a conical surface 34 that flares outwardly of the sleeve 31 toward the pressure plate 20. When the clutch is in a released position, the rounded noses 35 on the lever arms 29 engage with the cylindrical surface 33, but when the sleeve 31 is moved toward the right, as viewed in the drawing, these noses ride outwardly against the conical surface 34, being impelled by centrifugal force and the pressure of the springs 24.

In clutches of this type, it is customary to so position the sleeve 31 that it always engages with the noses 35, and in order to insure, for any given movement of the sleeve 31, that the latter will not prevent a sufficient rocking movement of each clutch lever to permit a shifting of the pressure plate 20 into driving position, the conical surface 34 is arranged with sufficient angularity, relative to the axis of the shaft 10, that the stub arms 28 do not prevent movement of the pressure plate to driving position. It will be apparent that the angular disposition of the surface 34 may be such, for any given limited movement of the sleeve 31, as to allow for any desired wearing of the frictional facings 14. Without a proper disposition of the surface 34, it is obvious that otherwise, the sleeve 31 would prevent a return of the pressure plate to driving position, since it would be holding the clutch levers in a position to prevent this action and, in this situation, the clutch would either not transmit any power, or it would be characterized by bad slippage.

In the operation of the clutch, the springs 24 compensate for the wear of the facings 14 and continually force the pressure plate into engagement with the friction disks until a limiting position is reached, which is determined by the permitted rock of the levers 25.

It will be obvious that, when the sleeve 31 is moved toward the left to occupy the position shown substantially in the drawing, thereby moving the pressure plate 20 to released position shown, the driving plate 16 will be thrown out of contact with the fixed plate 12, owing to its capacity for shifting axially relative thereto, that is, by reason of its toothed engagement with the annular driving plate 19. One of the most important advantages of the present design is its compactness, since the clutch levers are substantially housed within the major dimensions of the clutch. The construction is therefore capable of being installed in extremely restricted locations.

In Fig. 2 is illustrated a modified arrangement for actuating the clutch levers which is substantially in the nature of a toggle mechanism. A sleeve 36 is slidably keyed on the shaft 10 and is provided with a plurality of radially extending arms 37, each of which has pivotally secured at its outer end the similarly situated end of a link 38 whose inner end is pivotally attached to an arm 39 of a clutch lever 40 which in all other respects is identical with the lever 25. A collar 41 engages the sleeve to shift the same along the shaft 10 whereby the levers 40 are rocked into driving or released positions.

I claim:

1. In a spring loaded clutch, the combination of a driving plate shiftably connected to a rotary part, a fixed plate connected to a second rotary part and disposed on one side of the driving plate, a pressure plate disposed on the opposite side of the driving plate, studs mounted in the fixed plate and extending through the pressure plate, springs on the studs externally of the pressure plate adapted to place the driving plate in engagement with the fixed and pressure plates, respectively, bell crank levers pivotally mounted directly on the fixed plate, each having an arm engaging the inner face of the pressure plate and a second arm projecting externally of the pressure plate, and means engageable with the second arms for rocking the levers to release the pressure plate.

2. In a spring loaded clutch, the combination of a driving plate shiftably connected to a rotary part, a fixed plate having a hub connected to a second rotary part and disposed on one side of the driving plate, a plurality of lugs around the hub, a pressure plate disposed on the opposite side of the driving plate, studs mounted in the fixed plate and extending through the pressure plate, springs on the studs externally of the pressure plate adapted to place the driving plate in engagement with the fixed and pressure plates, respectively, bell crank levers pivotally mounted on the lugs, each having an arm engaging the inner face of the pressure plate and a second arm projecting externally of the pressure plate, and means engageable with the second arms for rocking the levers to release the pressure plate.

3. In a spring loaded clutch, the combination of a driving plate shiftably connected to a rotary part, a fixed plate connected to a second rotary part and disposed on one side of the driving plate, a pressure plate disposed on the opposite side of the driving plate, studs mounted in the fixed plate and extending through the pressure plate, springs on the studs externally of the pressure plate adapted to place the driving plate in engagement with the fixed and pressure plates, respectively, bell crank levers pivotally mounted directly on the fixed plate, each having an arm engaging the inner face of the pressure plate and a second arm projecting externally of the pressure plate, and a sleeve having an internal conical surface engageable with the second arms to release the pressure plate, the sleeve engaging with the second arms in the driving and released positions of the clutch and the conical surface having sufficient angularity relative to the axis of the clutch to provide for the free movement of the pressure plate to driving position under the influence of the springs as the clutch faces wear.

WILLIAM J. PEARMAIN.